E. J. DACEY.
TROLLEY POLE.
APPLICATION FILED JAN. 5, 1916.
1,199,669.
Patented Sept. 26. 1916.
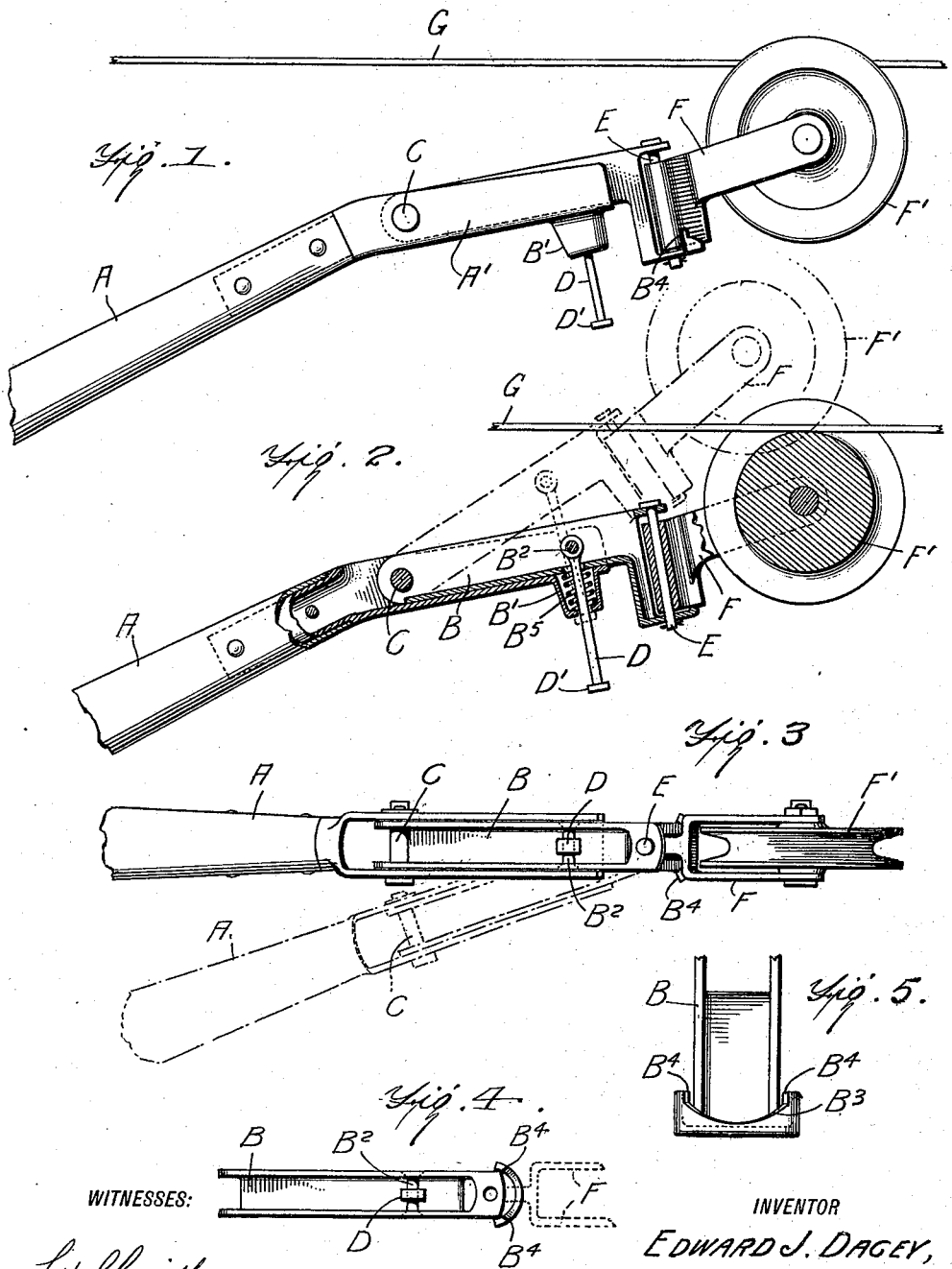
WITNESSES:
INVENTOR
EDWARD J. DACEY,
BY Munn & Co.
ATTORNEYS

UNITED STATES PATENT OFFICE.

EDWARD J. DACEY, OF ERITON, PENNSYLVANIA.

TROLLEY-POLE.

1,199,669.

Specification of Letters Patent. Patented Sept. 26, 1916.

Application filed January 5, 1916. Serial No. 70,424.

*To all whom it may concern:*

Be it known that I, EDWARD J. DACEY, a citizen of the United States, and a resident of Eriton, in the county of Clearfield and State of Pennsylvania, have invented a certain new and useful Improvement in Trolley-Poles, of which the following is a specification.

My present invention relates generally to trolley poles for electric cars and the like, and more particularly to certain improvements thereto whereby to do away with all friction on curves and prevent arcing between the wheel and the wire by maintaining the same in close even contact at all times.

The particular construction which I utilize for the purpose of carrying out these improvements and attaining the objects sought by the invention, is shown in the accompanying drawing, forming a part of this specification, and wherein—

Figure 1 is a side elevation of the upper portion of the trolley pole. Fig. 2 is a similar view partly broken away and in longitudinal section. Fig. 3 is a top plan view of the parts shown in Fig. 1. Fig. 4 is a detail plan view of the pivoted harp support, and Fig. 5 is an enlarged elevation of a portion of one end of the harp support shown in Fig. 4.

In accordance with my invention as shown in the several figures, the upper angular detachable and renewable end A' of a trolley pole, the body of which is generally indicated at A, is slotted to open upwardly and receive therein a harp supporting member B, and is further provided with a transverse horizontal pivot bolt C and a depending hollow boss adjacent its extremity and as indicated at B', the base of which is apertured and the interior of which forms a pocket for a purpose hereinafter described. The pivot bolt C extends also through the inner end of the harp support B, the latter having as particularly seen in Fig. 2, an intermediate cross pin B² to which the upper end of a rod D is swiveled, this rod depending through an opening in the support B and through the depending boss B' before mentioned, its lower outer end being provided with a head D'.

The outer end of the harp support B supports a substantially vertical pivot bolt E, upon which the rear end of the harp F is journaled to permit the latter with its trolley wheel F' to swing laterally with respect to the support B and the adjacent end of the pole A, in following curves in the trolley line G and thus eliminate all friction between the trolley line and the trolley wheel in the use of the apparatus. The lower portion of the outer end of the harp support B is also provided with a curved track B³ upon which the lower inner portion of the harp F rests, and with upright shoulders B⁴ at the opposite end of this track limiting the lateral movement of the harp, it being noted that the curvature of track B³ raises the harp slightly when the same swings laterally in order to offset any tendency of the wheel pulling away from the trolley line, the rear end of the harp having limited longitudinal movement upon its pivot bolt E before described. Thus with the lateral swinging movement of the trolley wheel and its harp and their forced vertical movement to some extent, together with the vertical swinging movement of the harp supporting member B under actuation of its spring B⁵ coiled around the rod D within the boss B' and bearing between the base of the latter and the said support B, I am enabled in use to do away with all friction on curves and prevent practically all arcing between the wheel and the trolley line. It is also to be noted that the curvature of track B³ enables the harp to seek its lowest level when off of the trolley wire or line and to thus maintain itself in substantial alinement with the support B and the trolley pole. In this way the replacement of the trolley wheel in connection with the wire, may be more readily effected.

I claim:—

1. A trolley pole having means at its upper end supporting a substantially vertical pivot bolt and provided adjacent said upper end with a curved transverse track, the side portions of which are elevated, and a trolley wheel supporting harp journaled upon the said pivot bolt and bearing upon the said track, said harp having a limited movement longitudinally of its said pivot bolt, for the purpose described.

2. A trolley pole having a harp supporting member adjacent its upper end provided at its extremity with a vertically disposed pivot bolt and a curved transverse track, and a trolley wheel supporting harp journaled upon the said pivot bolt to swing laterally on the said track, said harp having limited movement longitudinally of its pivot bolt whereby to yield vertically in accordance with the curvature of the track.

3. A trolley pole having harp supporting means at its upper end, a trolley wheel supporting harp, and a pivot connecting said harp and said supporting means, on which said harp has laterally swinging and vertical movements.

4. A trolley pole having a slotted upwardly opening outer end, a wheel supporting harp, and a harp supporting member disposed within the slotted upper end of the pole, said harp supporting member being pivoted at its inner end to said trolley pole to swing vertically with the harp and its wheel in respect to the upper end of the pole.

5. A trolley pole having a slotted upwardly opening outer end, a harp supporting member disposed within said slotted end of the pole and pivoted at its inner end thereto whereby its outer end may swing vertically, a wheel supporting harp carried by the said outer end of the supporting member, and a spring engaging the said supporting member whereby to urge the same in an upward direction.

6. A trolley pole, a harp supporting member pivoted to the said pole adjacent its outer end to swing vertically with respect thereto, a spring engaging said supporting member and normally urging the same upwardly, and a trolley wheel carrying harp pivotally connected to the free end of said supporting member to swing laterally with respect thereto.

EDWARD J. DACEY.

Witnesses:
  JOHN MCGUIRE,
  JOHN CUNNINGHAM.